US008369899B2

(12) United States Patent
Hasegawa

(10) Patent No.: US 8,369,899 B2
(45) Date of Patent: Feb. 5, 2013

(54) MOBILE ELECTRONIC DEVICE AND METHOD OF DISPLAYING ON SAME

(75) Inventor: Osamu Hasegawa, Yokohama (JP)

(73) Assignee: Kyocera Corporation, Kyoto (JP)

( * ) Notice: Subject to any disclaimer, the term of this patent is extended or adjusted under 35 U.S.C. 154(b) by 207 days.

(21) Appl. No.: 12/695,989

(22) Filed: Jan. 28, 2010

(65) Prior Publication Data

US 2010/0190531 A1    Jul. 29, 2010

(30) Foreign Application Priority Data

Jan. 28, 2009    (JP) .................................. 2009-017379

(51) Int. Cl.
*H04B 1/38*    (2006.01)
(52) U.S. Cl. ......................... 455/566; 455/410; 455/411
(58) Field of Classification Search .................. 455/566, 455/410, 411, 425, 432.3, 456.6, 550.1, 556.1–557
See application file for complete search history.

(56) References Cited

U.S. PATENT DOCUMENTS

| | | | |
|---|---|---|---|
| 2008/0122796 A1* | 5/2008 | Jobs et al. ..................... | 345/173 |
| 2008/0148182 A1* | 6/2008 | Chiang et al. ................. | 715/810 |
| 2009/0165125 A1* | 6/2009 | Brown et al. .................. | 726/21 |
| 2009/0253410 A1* | 10/2009 | Fitzgerald et al. ............ | 455/411 |

FOREIGN PATENT DOCUMENTS

JP    2002-300298    10/2002

* cited by examiner

*Primary Examiner* — Jinsong Hu
*Assistant Examiner* — Michael Nguyen
(74) *Attorney, Agent, or Firm* — Duane Morris LLP

(57) ABSTRACT

A mobile device and a displayed information protection method suitable for use with the mobile device are disclosed. In response to a trigger signal, a control unit determines if information presented on a display contains confidential information. If confidential information is displayed, the confidential information is concealed or removed from the display. The trigger signal may comprise, for example, an event such as an incoming telephone call, reception of electronic mail, and fingerprint authentication.

20 Claims, 11 Drawing Sheets

MOBILE ELECTRONIC DEVICE AND METHOD OF DISPLAYING ON SAME

CROSS-REFERENCE TO RELATED APPLICATION

The present application claims priority to Japanese Application No. 2009-017379, filed on Jan. 28, 2009, entitled "MOBILE DEVICE AND DISPLAYING METHOD FOR THE SAME". The content of which is incorporated by reference herein in its entirety.

FIELD

Embodiments of the present disclosure relate generally to mobile devices, and more particularly relate to a mobile device capable to communicate with other devices.

BACKGROUND

Recently, image data such as a photograph and personal information such as a telephone directory can be used in mobile devices, such as a mobile telephone. In the mobile devices, a display screen can often be customized by a user. For example, personal information, a favorite photograph, or a memo can be presented on a standby screen or a menu screen.

It is possible that information in a mobile device may be misappropriated by an unintended third party. For example, the unintended third party can see the standby screen presenting the personal information customized by the user.

Accordingly, there is a need for improved information security in the mobile devices.

SUMMARY

A displayed information protection system suitable for use with a mobile device is disclosed. In response to a trigger, a control unit determines if information presented on a display contains confidential information such as personal information of a user. If the confidential information is displayed, the confidential information is concealed or removed from the display. The trigger may comprise, for example, an event such as an incoming telephone call, reception of electronic mail, and fingerprint authentication.

A first embodiment comprises a mobile device. The mobile device comprises a display unit operable to display a first image on a display screen thereof. The mobile device further comprises a control unit. The control unit comprises a sensing unit operable to sense a trigger signal, and a determination unit operable to determine whether the first image comprises specific information. The control unit further comprises a substitution unit operable to display a second image on the display screen in response to the trigger signal to camouflage the first image, if the first image comprises the specific information.

A second embodiment comprises a displayed information protection method for a mobile device. The method comprises displaying an original image on a display screen thereof, sensing a trigger signal, and determining whether the original image comprises specific information. The method further comprises displaying a camouflage image on the display screen in response to the trigger signal to camouflage the original image, if the original image comprises the specific information.

A third embodiment comprises a computer-readable medium for displayed information protection. The computer-readable medium comprises program code for displaying an original image on a display screen thereof, sensing a trigger signal, and determining whether the original image comprises specific information. The computer-readable medium further comprises program code for displaying a camouflage image on the display screen in response to the trigger signal to camouflage the original image, if the original image comprises the specific information.

BRIEF DESCRIPTION OF THE DRAWINGS

Embodiments of the present disclosure are hereinafter described in conjunction with the following figures, wherein like numerals denote like elements. The figures are provided for illustration and depict exemplary embodiments of the present disclosure. The figures are provided to facilitate understanding of the present disclosure without limiting the breadth, scope, scale, or applicability of the present disclosure. The drawings are not necessarily made to scale.

DETAILED DESCRIPTION OF EXEMPLARY EMBODIMENTS

The following description is presented to enable a person of ordinary skill in the art to make and use the embodiments of the disclosure. The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding technical field, background, brief summary or the following detailed description. The present disclosure should be accorded scope consistent with the claims, and not limited to the examples described and shown herein.

Embodiments of the disclosure are described herein in the context of one practical non-limiting application, namely, a mobile phone. Embodiments of the disclosure, however, are not limited to such mobile phones, and the techniques described herein may also be utilized in other applications. For example, embodiments may be applicable to digital cameras, electronic game machines, digital music players, personal digital assistance (PDA), personal handy phone system (PHS), lap top computers, and the like.

As would be apparent to one of ordinary skill in the art after reading this description, these are merely examples and the embodiments of the disclosure are not limited to operating in accordance with these examples. Other embodiments may be utilized and structural changes may be made without departing from the scope of the exemplary embodiments of the present disclosure.

Figure 1:
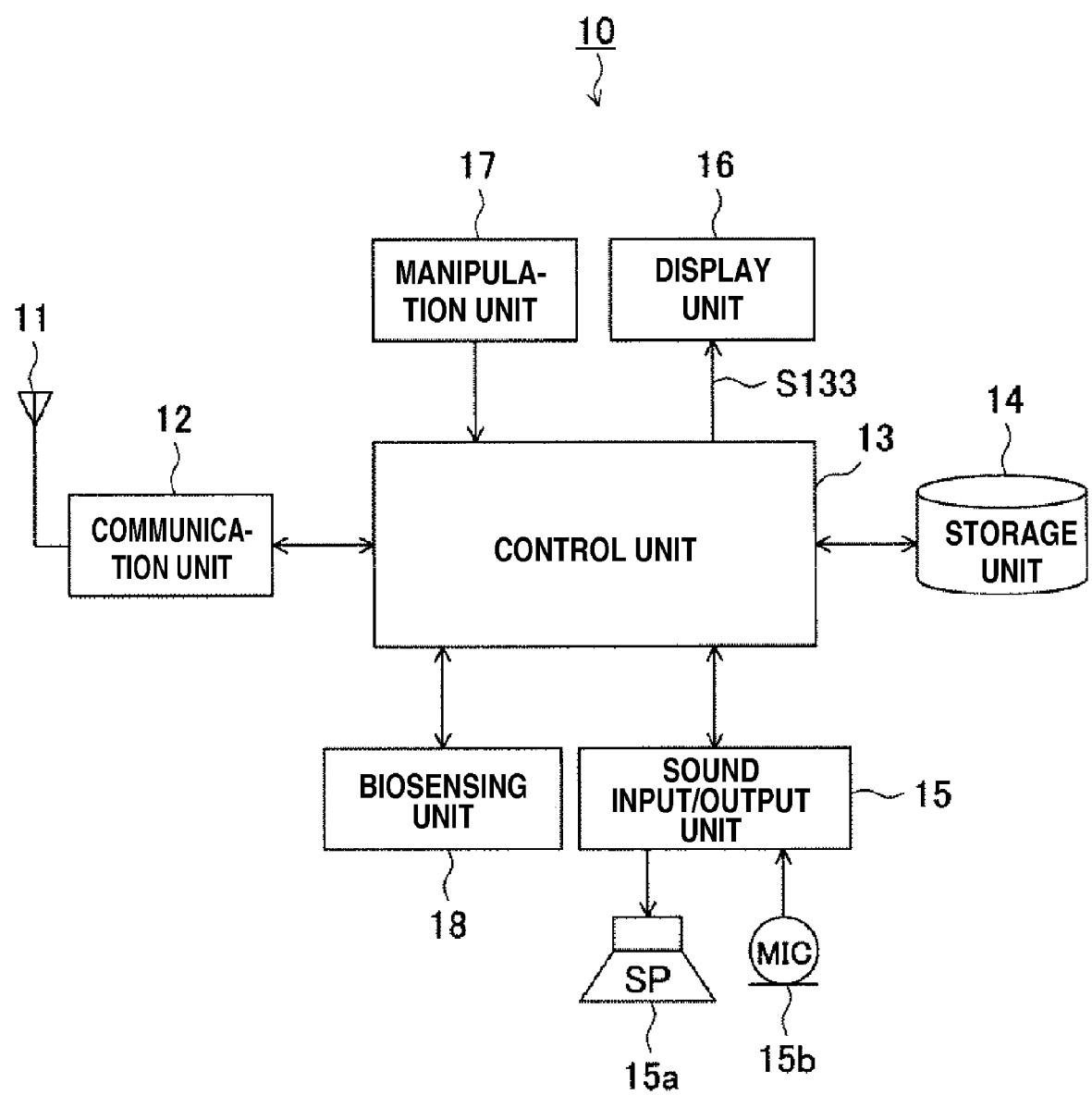
FIG. 1 is an illustration of a schematic block diagram of an exemplary mobile device according to an embodiment of the disclosure.

FIG. 1 is an illustration of a schematic block diagram of an exemplary electronic mobile communication device 10 (mobile device 10) according to an embodiment of the disclosure. The schematic block diagram shown in FIG. 1 is suitably configured to perform signal processing of the mobile device 10.

The mobile device 10 comprises an antenna 11, a communication unit 12, a control unit 13, a storage unit 14, a sound input/output unit 15, a display unit 16, a manipulation unit 17, and a biosensing unit 18.

The antenna 11 may be, for example and without limitation, a built-in antenna, a rod antenna, and the like. The antenna 11 is configured to transmit and receive electromagnetic waves at a predetermined frequency band to and from a base station (not illustrated) respectively.

The mobile device 10 is operable to transmit and receive a plurality of communication signals comprising data signals via a communication unit 12 transceiver (not shown). The communication unit 12 is operable to carry out a radio communication with a network side device via a mobile communication network (not shown) such as the base station communicatively coupled to the mobile communication network (not shown). The communication unit 12 transceiver communicates with a base station transceiver via a wireless data communication link (not shown). The communication unit 12 transceiver cooperates with the base station transceiver with a suitably configured RF antenna arrangement such as the antenna 11 that can support a particular wireless communication protocol and modulation scheme. The data signals may comprise, for example but without limitation, voice data during voice communication, text data during email, and web data during accessing web site. Data obtained from the data signals may be displayed on the display unit 16 for performing the display customizing function or the camouflage function.

The communication unit 12 modulates a transmitting signal from the control unit 13 as a radio signal to the base station through the antenna 11, and demodulates a radio signal received from the base station through the antenna 11. The control unit 13 receives the demodulated signal form the communication unit 12.

The control unit 13 may comprise transmission/reception of signals at the communication unit 12. The control unit 13 controls overall operation of the mobile device 10. For example the control unit 13 may control operations of the mobile device 10 so that processes of the mobile device 10 are suitably performed such that various processing are performed by proper procedures in response to manipulation of the manipulation unit 17. These processes comprise, for example but without limitation, exerting the telephone call function, the electronic mail function, the fingerprint authentication function, the display customizing function, the camera function, the electronic money function, the camouflage function, the website browsing function, the memo function, the schedule function, and the like. The control unit 13 also controls a communication of the communication unit 12, and access to the storage unit 14 such as access to the extraction result, data display on the display unit 16, character input by the manipulation of the manipulation unit 17, voice processing of the sound input/output unit 15, and the like. For example, control unit 13 can control the communication unit 12 to perform the telephone call function or the electronic mail function. For another example, the control unit 13 can control the display unit 16 to display data in performing the display customizing function or the camouflage function.

The control unit 13 may comprise a computer (microprocessor) or another processor for performing a process based on a program (operating system, application program, etc.) stored in the storage unit 14. The control unit 13 may read instruction code sequentially from programs such as the operating system and the application program which are stored in the storage unit 14, and perform the programs. For example, camouflage methods in the control unit 13 may be realized on the computer by one or a plurality of programs, or may be at least partially realized by hardware.

The telephone call function is configured to conduct voice communication with another communication device. The electronic mail function is configured to generate an electronic mail and transmitting and receiving same. The fingerprint authentication function is configured to perform a fingerprint authentication using a fingerprint comprising biological information. The camera function is configured to generate photograph of a subject. The electronic money function is configured to make electronic payments. The control unit 13 is described in more detail in the context of discussion of FIG. 5 below.

The storage unit 14 is operable to store various kinds of data used for various processes of the mobile device 10. In practical embodiments, the storage unit 14 may comprise, for example but without limitation, a non-volatile storage device (non-volatile semiconductor memory, hard disk device, optical disk device, and the like), a random access storage device (for example, SRAM, DRAM), or any other form of storage medium known in the art. For example, the storage unit 14 may store, a telephone directory/address book for managing personal information such as a telephone number and e-mail address of a communication party, an audio file for reproducing a ring tone and alarm tone, an image file for a standby screen, various kinds of trigger data and trigger signals, a temporary data used in a program process, reference fingerprint data used in performing the fingerprint authentication, a list comprising personal information of the user, a schedule book, a computer program which is executed by the control unit 13, an operating system, an application program, output result of the control unit 13, tentative data used in executing a program processing, and the like. The storage unit 14 may be coupled to the control unit 13 such that the control unit 13 can read information from and write information to storage unit 14. As an example, the control unit 13 and storage unit 14 may reside in their respective ASICs. The storage unit 14 may also be integrated into the control unit 13. In an embodiment, the storage unit 14 may comprise a cache memory for storing temporary variables or other intermediate information during execution of instructions to be executed by the control unit 13.

The storage unit 14 may also comprise non-volatile memory for storing instructions to be executed by the control unit 13.

The sound input/output unit 15 carries out a process for outputting a voice signal output from the speaker 15a and receiving a voice signal input in the microphone 15b. In this manner, the sound input/output unit 15 amplifies the analog voice input from the microphone 15b, and carries out an analog/digital conversion to obtain a digital voice input. The sound input/output unit 15 applies a signal processing such as an encoding or the like to the digital voice input to obtain an encoded digital voice input, and sends the encoded digital voice input to the control unit 13. The sound input/output unit 15 is also operable to apply a signal processing to a digital voice data supplied from the control unit 13. In this manner, the sound input/output unit 15 performs decoding, digital/analog conversion, and amplification to convert the digital voice data to an analog voice signal for output to the speaker 15a.

The display unit 16 comprises a display screen (not shown) that may be formed by a liquid crystal panel (LCD). For example, the display screen of the display unit 16 may be formed by an organic electro-luminescence (OEL) panel. Various kinds of information can be displayed on the display screen of the display unit 16 via an image/video signal supplied from the control unit 13. For example, a substitution target such as a standby screen or a menu screen, and a camouflage screen can be displayed on the display screen of the display unit 16 as described in more detailed below. In this document, the display screen of the display unit 16 and display unit 16 may be used interchangeably hereinafter.

The manipulation unit 17 may comprise a plurality of keys, such as but without limitation, a power key, a telephone call key, numeric keys, character keys, arrow keys or direction keys, a determination key, a transmission key, and like to which various functions can be allocated.

The biosensing unit 18 is formed by a fingerprint sensor as explained in more detail below that performs a fingerprint authentication. In this manner, the biosensing unit 18 scans a fingerprint to obtain fingerprint data form an image producing unit (not shown), and outputs the fingerprint data to the control unit 13.

Figure 2:
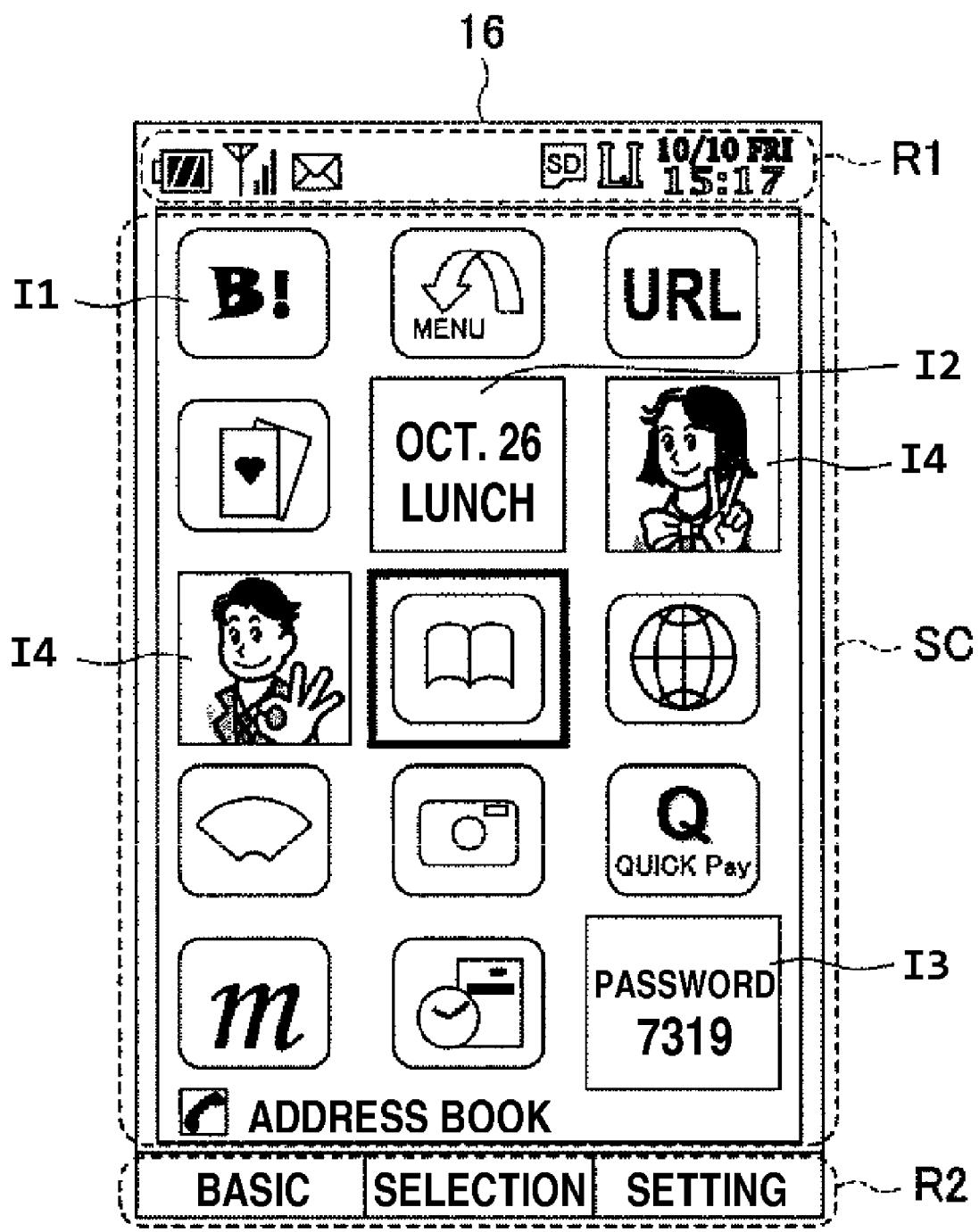
FIG. 2 is an illustration of a schematic view of an exemplary standby screen according to an embodiment of the disclosure.
Figure 3:
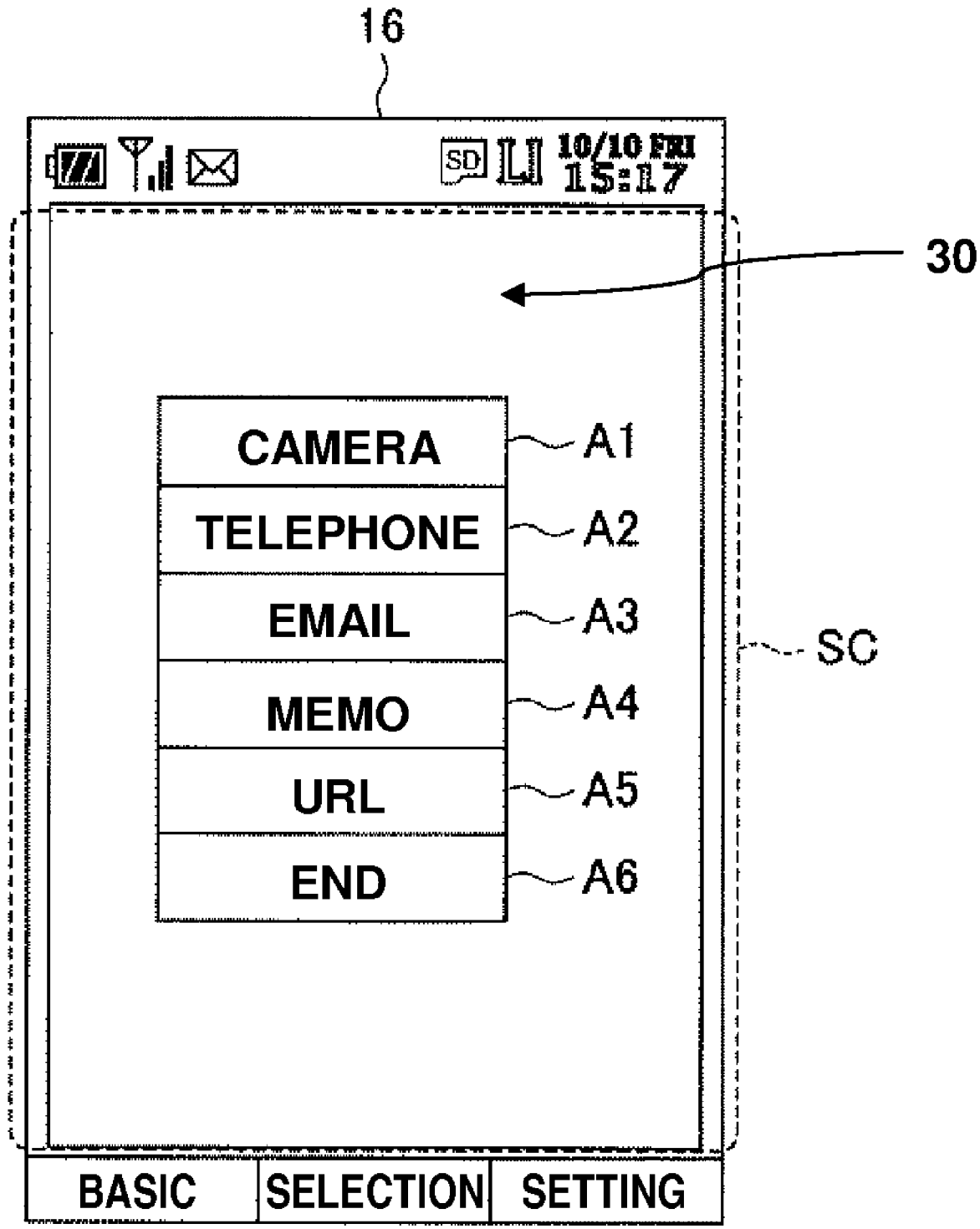
FIG. 3 is an illustration of a schematic view of an exemplary menu screen according to an embodiment of the disclosure.

FIG. 2 is an illustration of a schematic view of an exemplary standby screen 20 according to an embodiment of the disclosure. FIG. 3 is an illustration of a schematic view of an exemplary menu screen 30 according to an embodiment of the disclosure.

The embodiment shown in FIG. 2 comprises a standby screen 20 displayed on a display screen SC of the display unit 16, a display region R1, and a region R2. A display customizing function can locate a desired icon or memo on the standby screen 20 or edit items displayed on the menu screen 30. The standby screen 20 and the menu screen 30 can be customized by the display customizing function in order to improve usability. The display region R1 can be displayed above the display screen SC indicating a remaining battery level and current time. The display region R2 can be displayed below the display screen SC comprising a menu bar.

The standby screen 20 comprises various icons arrayed at a substantially equal interval on the display screen SC. The icons comprise, for example but without limitation, an icon I1 that acts as a shortcut, an icon I2 that acts as a schedule book, an icon I3 that acts as a memo pad, an icon I4 that is a photograph, and the like.

In this manner, shortcut to a website can be displayed in the icon I1, a schedule such as "OCT. 26th, LUNCH" can be displayed in the icon I2, and a memo such as "PASSWORD 7319" can be displayed in the icon I3.

The icons I1 to I4 are processed as an image. Each icon can be located in a desired position on the display screen SC. Each icon can appropriately be deleted or copied.

As shown in FIG. 3, the menu screen 30 is displayed on the display screen SC of the display unit 16. The menu screen 30 can comprise various menu items such as items A1-A6. As with the standby screen 20, items A1-A6 can be suitably changed in the menu screen 30 as desired by a user. The items A1-A6 can also be deleted or copied. Also, the icons such as the icons I1 to I4 can be located in the menu screen 30.

Figure 4:
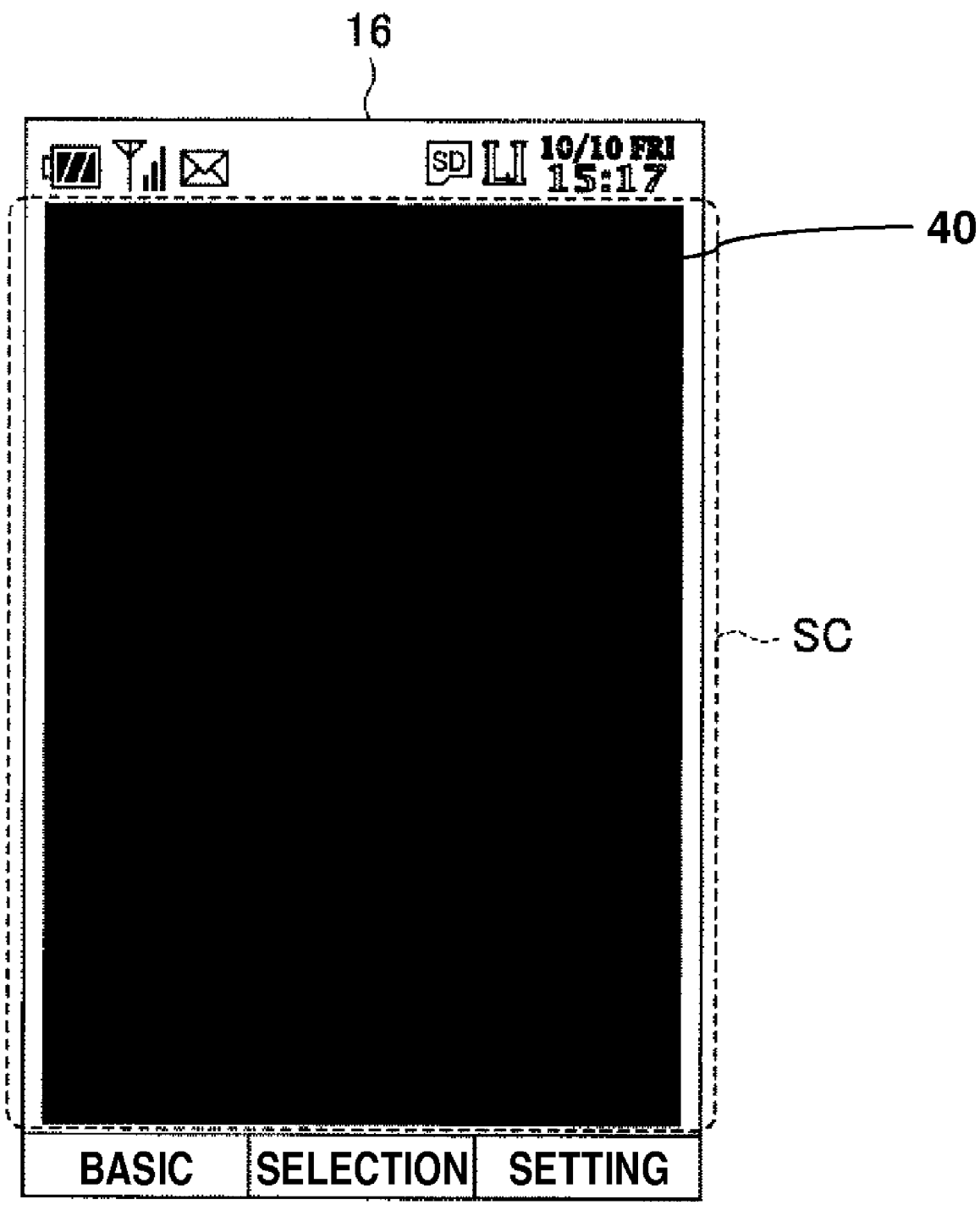
FIG. 4 is an illustration of a schematic view of an exemplary camouflage screen according to an embodiment of the disclosure.

FIG. 4 is an illustration of a schematic view showing an exemplary camouflage screen 40 according to an embodiment of the disclosure. As described above, the standby screen 20 and the menu screen 30 can be customized by the display customizing function in order to improve the usability. In particular, frequently used user's preferences and personal information can be presented on the standby screen 20. For example, the personal information (specific information) such as the shortcut, the schedule, the memo, and the photograph can be displayed in the icons I1 to I4 (FIG. 2). The personal information comprises a personal name or a telephone number described in the telephone directory, an image that the user does not want the unintended third party to access. The user can suitably set the personal information.

If the user losses the mobile device 10, the unintended third party who obtains the mobile device 10 can, for example, see the standby screen 20. Therefore, the unintended third party can easily access and read the personal information of the user from the display screen 16.

According to an embodiment, to prevent access to the personal information of the user by an unintended third party, the mobile device 10 uses the camouflage function mentioned above. The camouflage function is configured to hide the icons displayed on the display unit 16 in response to a trigger that can be suitably selected by the user. The trigger may be, for example but without limitation, an incoming telephone call, a reception of the electronic mail, a fingerprint authentication, or the like. For example, if an incoming telephone call is selected as the trigger, the user can dial the telephone number of the mobile device 10 from another phone such as a public phone to cause the standby screen 20 to be substituted with a camouflage screen 40 such as a solid black screen. The camouflage screen 40 may comprise other configurations, such as but without limitation, a blank, a color, a picture, a sign, and the like may also be presented on the display screen SC as described in more detail below in the context of discussion of FIGS. 9-11.

Hereinafter, a display screen obtained by the camouflage function is referred to as "camouflage screen (second display screen)". The camouflage function is applied to the display screen SC on which the personal information is displayed such as the standby screen 20 and the menu screen 30. The display screen SC on which the personal information is displayed may be referred to as "substitution target screen" (first display screen).

Because the camouflage screen 40 prevents the unintended third party from recognizing the personal information, it is not necessary that the standby screen 20 be displayed in its entirety in solid black. For example, a photograph or a moving image, which may be seen by the unintended third party, can be displayed on the entire display screen SC instead of the standby screen 20. Therefore, the unintended third party who may obtain the mobile device 10 can be prevented from seeing the original standby screen such as the standby screen 20.

Figure 5:
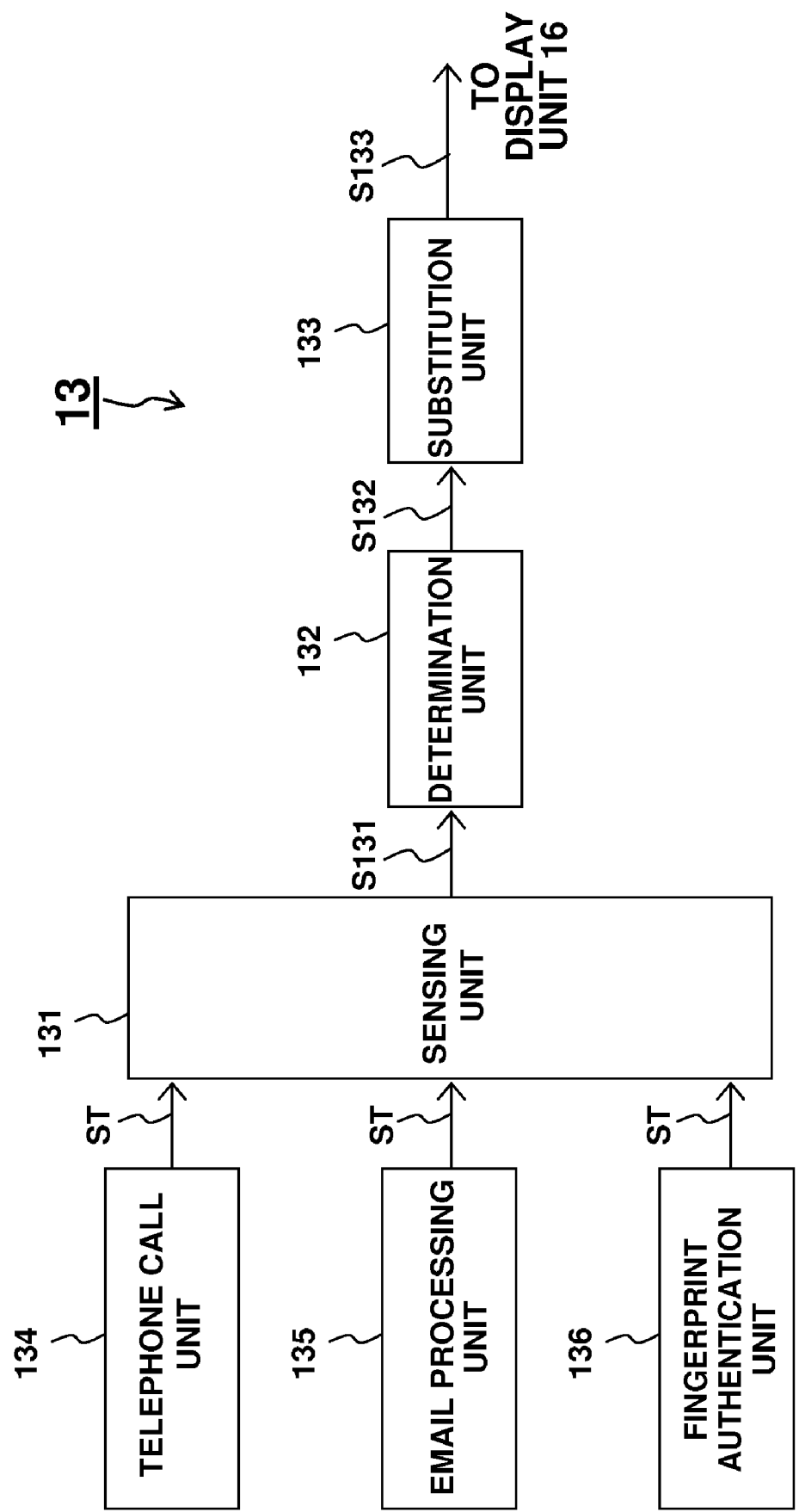
FIG. 5 is an illustration of a schematic block diagram of an exemplary configuration of a control unit according to an embodiment of the disclosure.

FIG. 5 is an illustration of a schematic block diagram showing an exemplary configuration of a control unit 13 according to an embodiment of the disclosure. The control unit 13 comprises a sensing unit 131, a determination unit 132, and a substitution unit 133. The control unit 13 also comprises a plurality of trigger generators, such as but without limitation, a telephone call unit 134 that performs the telephone call function, an electronic mail processing unit 135 that performs the electronic mail function, and a fingerprint authentication unit 136 that performs the fingerprint authentication.

The sensing unit 131 is operable to sense a trigger signal from at least one of the trigger signal generators. The sensing unit 131 also performs various sensing processing when the substitution target screen is displayed on the display unit 16. The sensing processing is performed when the substitution target screen is substituted with the camouflage screen 40.

For example, if the incoming telephone call is used as the trigger the telephone call unit 134 receives the incoming telephone call and generates and sends a trigger signal ST to the sensing unit 131 indicating presence of the incoming call.

For another example, if reception of the electronic mail is used as the trigger, the electronic mail processing unit 135 receives the electronic mail and generates and sends the trigger signal ST to the sensing unit 131 indicating presence of the electronic mail.

For another example, manipulation of the manipulation unit 17 comprising a plurality of keys to which various functions are allocated can be used as the trigger. In this manner, when the keys are manipulated by the user, the manipulation unit 17 (FIG. 1) generates a signal corresponding to the manipulation contents, and sends the signal as a user instruction to the control unit 13.

For another example, if the fingerprint authentication is used as the trigger, the fingerprint authentication unit 136 authenticates the fingerprint, generates the trigger signal ST indicating a successful fingerprint authentication, and sends the trigger signal ST to the sensing unit 131. The camouflage screen 40 is maintained until the fingerprint authentication is successfully performed.

When the sensing unit 131 senses the trigger signal ST from at least one of the trigger generators and the manipulation unit 17, the sensing unit 131 sends a sensing signal S131 to the determination unit 132 indicating that the trigger signal ST is sensed.

On the other hand, when the sensing unit 131 does not sense the trigger signal ST, the sensing unit 131 does not output the sensing signal S131 to the determination unit 132.

The sensing unit 131 performs the following sensing processing when the camouflage screen 40 is displayed on the display unit 16. The sensing processing is performed when the camouflage screen 40 is returned to the substitution target screen such as the original display screen or the display screen SC.

The sensing processing is performed if the fingerprint authentication is used as the trigger. When the sensing unit 131 senses the trigger signal ST indicating the successful fingerprint authentication from the fingerprint authentication unit 136, the sensing unit 131 outputs the sensing signal S131 indicating the successful fingerprint authentication to the determination unit 132.

Otherwise, when the sensing unit 131 does not sense the trigger signal ST indicating the successful fingerprint authentication from the fingerprint authentication unit 136, the sensing unit 131 does not output the sensing signal S131 to the determination unit 132.

The determination unit 132 performs the following determination processing when the substitution target screen is displayed on the display unit 16. The determination processing is performed when the substitution target screen is substituted with the camouflage screen.

When the sensing signal S131 is sent to the determination unit 132 from the sensing unit 131, the determination unit 132 determines whether the personal information is displayed in the substitution target screen (display screen SC) on the display unit 16.

In this manner, the determination unit 132 accesses the list comprising personal information of the user stored in the storage unit 14, and determines whether each icon displayed on the substitution target screen on the display unit 16 corresponds to the personal information described in the list. Personal data defined by the user as the personal information is registered in the list. The personal data may comprise, for example but without limitation, a personal name, a telephone number, a photograph, a memo, a schedule, and the like. The determination unit 132 can detect, for example but without limitation, icons indicating the personal information, characters corresponding to the personal information displayed on a text, attribute information, additional information, decorative information, copyright information, and the like.

For example, the icons I1 to I4 indicating the personal information can be displayed on the standby screen 20 of the substitution target screen (display screen SC). In this case, the determination unit 132 determines whether each of the icons I1 to I4 corresponds to the personal data. If the determination unit 132 determines that any of the icons I1 to I4 comprises the personal data, the determination unit 132 sends a signal S132 to the substitution unit 133 indicating that the personal information is displayed on the substitution target screen. Similarly, the determination unit 132 can determine, for example, whether each of the items A1-A6 of the menu screen 30 corresponds to the personal data and send a signal S132 to the substitution unit 133 indicating that the personal information is displayed on the substitution target screen.

If the icons I1 to I4 indicating the personal information is not displayed on the standby screen 30 or the menu screen 30 of the substitution target screen, the determination unit 132 does not send the signal S132 to the substitution unit 133, thereby presence of personal data on the standby screen 20 or the menu screen 30 is not indicated to the substitution unit 133.

The determination unit 132 performs the following determination processing when the camouflage screen 40 is displayed on the display unit 16. The determination processing may end when the camouflage screen 40 is returned to the original display screen (substitution target screen).

When the sensing signal S131 is inputted into the determination unit 132 from the sensing unit 131, the determination unit 132 determines whether the camouflage screen 40 is displayed on the display unit 16. If it is determined that the camouflage screen is displayed on the display unit 16, the determination unit 132 sends the signal S132 to the substitution unit 133 indicating the camouflage screen 40 is displayed on the display unit 16. If it is determined that that the camouflage screen is not displayed on the display unit 16, the determination unit 132 does not send the signal S132 to the substitution unit 133.

The substitution unit 133 performs the following substitution processing when the substitution target screen is displayed on the display unit 16. The substitution processing is completed when the substitution target screen is substituted with the camouflage screen 40.

If the result signal S132 from the determination unit 132 is received by the substitution unit 133, the substitution unit 133 extracts the icon indicating the personal information from the standby screen 20 of the substitution target screen (display screen SC) in order to return the camouflage screen 40 to the original display screen (i.e., the screen before the camouflage screen 40 is displayed). The substitution unit 133 also extracts the position in which the extracted icon is located. The substitution unit 133 stores the extraction result in the storage unit 14.

Then the substitution unit 133 outputs a display signal S133 to the display unit 16 such that the icon (for example, icon I1 to I4) indicating the personal information cannot be recognized, thereby substituting the substitution target screen displayed on the display unit 16 with the camouflage screen 40.

Therefore, for example, the standby screen 20 (FIG. 2) displayed on the display unit 16 is substituted with the camouflage screen 40 (FIG. 4). Because the entire display screen SC is displayed in the solid black in this example, the icon indicating the personal information cannot be recognized.

If the signal S132 is not sent to the substitution unit 133 from the determination unit 132, the substitution unit 133 does not perform the substitution processing. In this manner, for example, the standby screen 20 (FIG. 2) displayed on the display unit 16 is maintained.

In order to deal with emergency, when the telephone call unit 134 receives a predetermined telephone number, the substitution unit 133 does not perform the substitution processing. In this manner, a dialed call telephone number is displayed, for example, on the solid-black background on the display screen SC of the display unit 16. Therefore, in case of emergency, the dialed call can be performed if the predetermined telephone number is recognized by the telephone call unit 134. The predetermined telephone number may comprise, for example but without limitation, a dialed call to emergency numbers such as the police or the fire department, a communication-company service number in which the mobile device 10 is registered, the telephone number that is already registered in the telephone directory by the telephone call function, and the like.

The substitution processing can also be terminated, when the electronic mail processing unit 135 receives a transmission of the electronic mail, or when the fingerprint authentication unit 136 performs the fingerprint authentication successfully.

The substitution unit 133 performs the following substitution processing when the camouflage screen 40 is displayed on the display unit 16. The substitution processing is performed when the camouflage screen 40 is returned to the original display screen (substitution target screen).

When the signal S132 indicating the determination result is sent from the determination unit 132 and received by the substitution unit 133, the substitution unit 133 reads the extraction result stored in the storage unit 14.

The substitution unit 133 substitutes the camouflage screen 40 with the original display screen. Then, the substitution unit 133 accesses the extraction result to return the substituted icon to the original icon such as any of the icons I1 to I4. Therefore, the camouflage screen 40 is returned to the original standby screen such as the standby screen 20.

The substitution unit 133 does not perform the substitution, if the signal S132 is not received by the substitution unit 133. Therefore, for example, the standby screen 20 displayed on the display unit 16 is maintained.

Sensing and determination processing is explained in more detail in the context of discussion of FIGS. 7-8 below.

Figure 6:
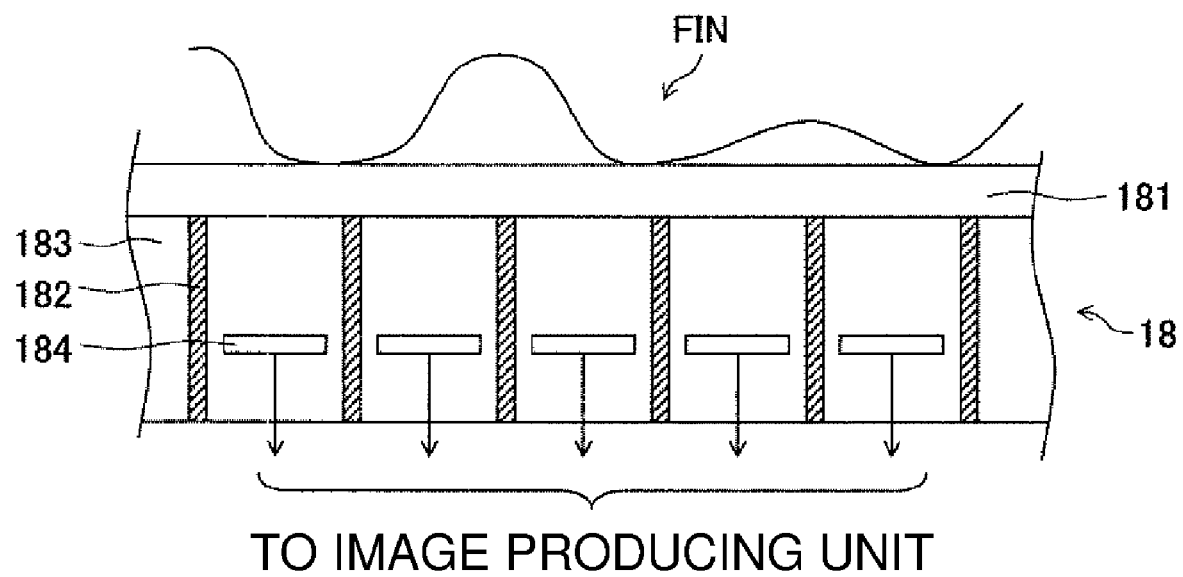
FIG. 6 is an illustration of a schematic sectional view of an exemplary configuration of a biosensing unit according to an embodiment of the disclosure.

FIG. 6 is an illustration of a schematic sectional view of an exemplary configuration of a biosensing unit according to an embodiment of the disclosure. In the embodiment shown in FIG. 6, the biosensing unit 18 is formed by a fingerprint sensor. Therefore, the biosensing unit 18 detects a difference in electrostatic capacitance based on irregularities of the fingerprint of a finger FIN, and scans (detects) the fingerprint (biological information) based on the detected difference in electrostatic capacitance.

The biosensing unit 18 comprises a protective film 181, a plurality of partitions 182, a plurality of electrode chambers 183, and a plurality of electrodes 184.

The electrode chambers 183 (tens of thousands) are partitioned by the partitions 182 formed beneath the firm protective film 181 with which a surface of the finger FIN comes into contact. The electrode 184 is located in each of the electrode chambers 183. When the surface of the finger FIN comes into contact with the protective film 181, a difference in distance of the surface of the finger FIN and the electrode 184 is generated due the irregularities of the fingerprint. A larger amount of charges are accumulated in the electrode 184 as the distance shortens. The biosensing unit 18 reads the charges accumulated in the electrode 184, and outputs the charges to an image producing unit (not shown) in the biosensing unit 18.

The charges accumulated in the electrode 184 are inputted into the image producing unit. The image producing unit quantifies the charge amount, and produces fingerprint data such that the fingerprint authentication can be performed. The biosensing unit 18 outputs the fingerprint data produced by the image producing unit to the control unit 13.

The fingerprint authentication unit 136 (FIG. 5) of the control unit 13 performs the fingerprint authentication based on comparison between the fingerprint data and the reference fingerprint data stored in the storage unit 14. When the fingerprint authentication is successfully performed, the fingerprint authentication unit 136 produces the trigger signal ST indicating the successful fingerprint authentication to send the trigger signal ST to the sensing unit 131.

Figure 7:
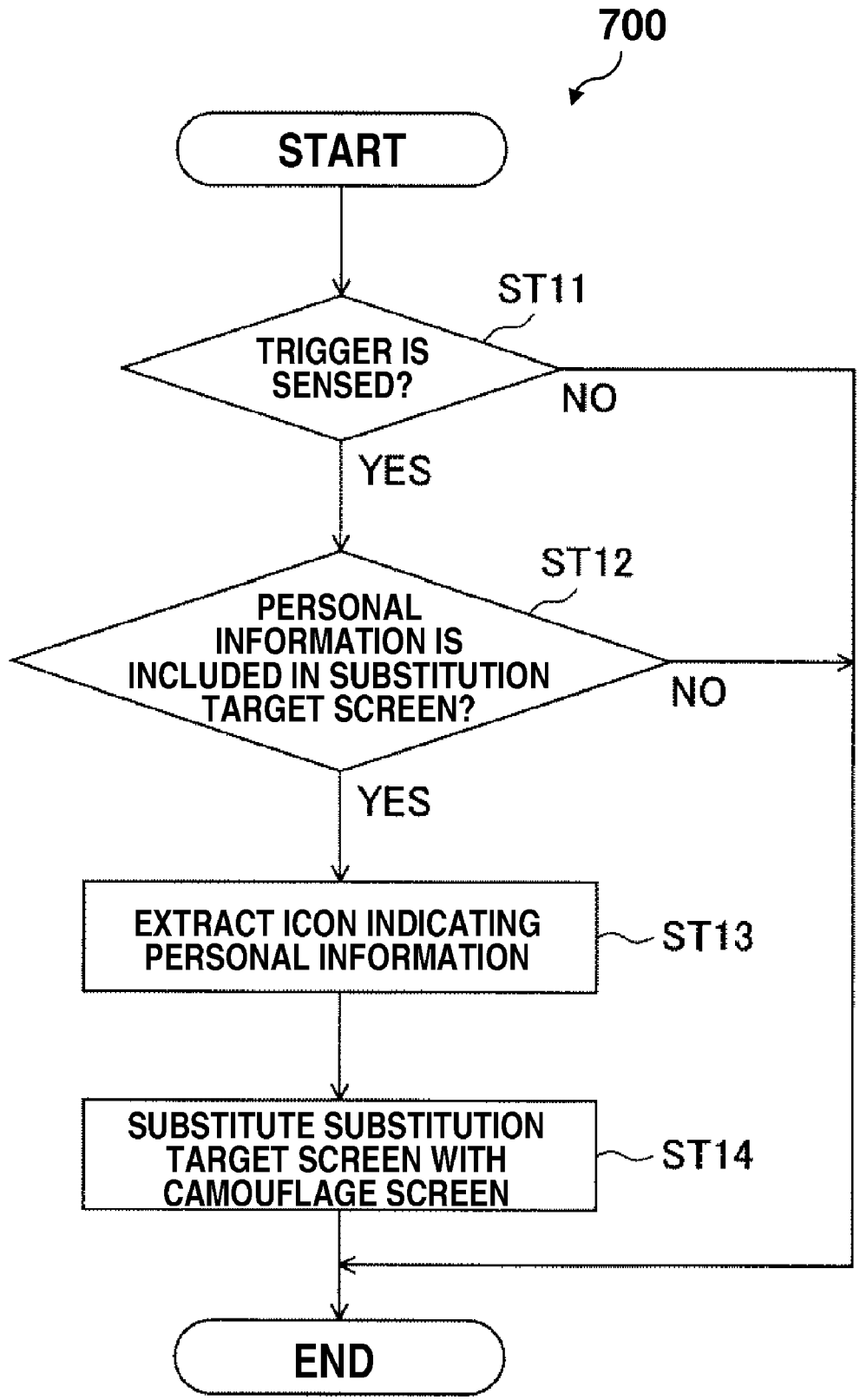
FIG. 7 is an illustration of a flowchart showing an exemplary operation of a mobile device according to an embodiment of the disclosure.
Figure 8:
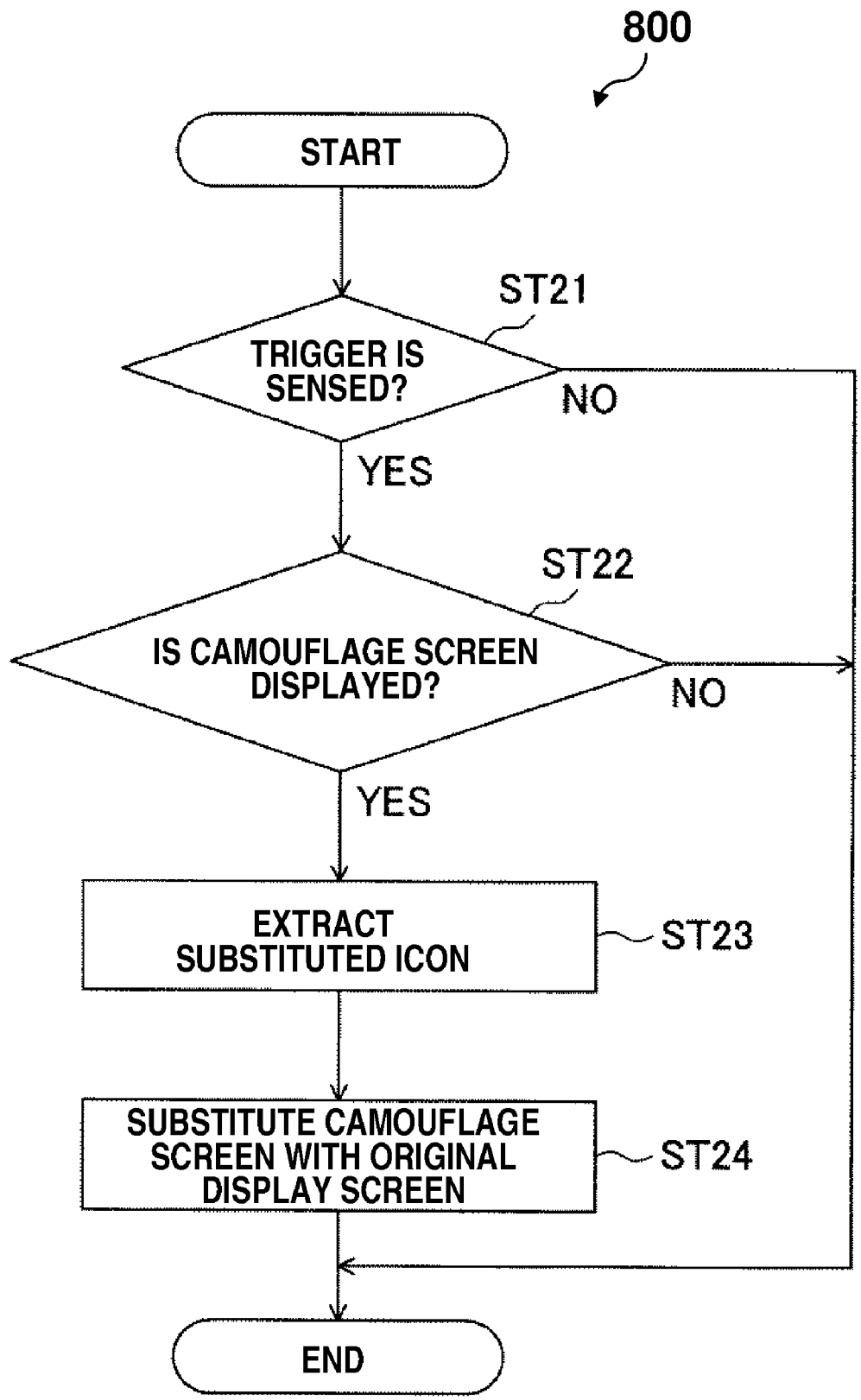
FIG. 8 is an illustration of a flowchart showing an exemplary operation of a mobile device according to an embodiment of the disclosure.

FIGS. 7-8 are illustrations of flowcharts showing exemplary displayed information protection processes 700-800 suitable for use with the mobile device 10 according to two embodiments of the disclosure. The various steps performed in connection with processes 700-800 may be performed by software, hardware, firmware, a computer-readable medium having computer executable instructions for performing the process method, or any combination thereof. The processes 700-800 may be recorded in a computer-readable medium such as a semiconductor memory, a magnetic disk, an optical disk, and the like, and can be accessed and executed, for example, by a computer CPU in which the computer-readable medium is stored. It should be appreciated that processes 700-800 may include any number of additional or alternative steps, the steps shown in FIGS. 7-8 need not be performed in the illustrated order, and processes 700-800 may be incorporated into a more comprehensive procedure or process having additional functionality not described in detail herein. For illustrative purposes, the following description of processes 700-800 may refer to elements mentioned above in connection with FIGS. 1-6. In practical embodiments, portions of processes 700-800 may be performed by different elements of the mobile device 10 for protecting personal information of the user from an unintended third party, e.g., the communication unit 12, the control unit 13, the storage unit 14, the sound input/output unit 15, the display unit 16, the manipulation unit 17, the biosensing unit 18, etc. Process 700-800 may have functions, material, and structures that are similar to the embodiments shown in FIGS. 1-6. Therefore common features, functions, and elements may not be redundantly described here.

FIG. 7 is an illustration of a process 700 showing the substitution target screen is changed to the camouflage screen 40 when an incoming telephone call is set as a trigger in the initial setting. However, other functions, such as but without limitations, a reception of the electronic mail, a manipulation of the manipulation unit, a fingerprint authentication, and the like, can also be set as the trigger in the initial setting. In an embodiment, if the key manipulation is not performed for a predetermined time (i.e., five minutes), elapsed time can be used as the trigger. For example, the elapsed time is counted using a timer.

Alternatively, it is not necessary that any of the trigger functions be set to the trigger initially. In this manner, the sensing unit 131 can set one of the functions on the fly based on a corresponding signal arrival time. For example, the sensing unit 131 can set the trigger function on the fly to one of the functions which has the shortest signal arrival time (which is received by the sensing unit 131 faster than the other functions).

Process 700 may begin by the sensing unit 131 performing the sensing processing (Inquiry Step ST11). If the sensing unit 131 senses the trigger signal ST (Yes branch of the inquiry Step ST11), the sensing unit 131 sends the sensing signal S131 to the determination unit 132 indicating that the sensing unit 131 has received the trigger signal ST.

The case in which the sensing unit 131 senses the trigger signal ST corresponds to the case in which the user dials the telephone number of the mobile device 10 using a second communication device other that the mobile device 10. In response to the communication being initiated between the second communication device and the mobile device 10, the telephone call unit 134 generates and sends the trigger signal ST to the sensing unit 131 indicating the incoming telephone call.

However, if the sensing unit 131 does not sense the trigger signal ST (NO branch of the inquiry Step ST11), process 700 ends.

The case in which the sensing unit 131 does not sense the trigger signal ST corresponds to the case in which the user does not dial the telephone number of the mobile device 10 using the second communication device. Therefore, the substitution target screen displayed on the display unit 16 is maintained.

If the sensing unit 131 senses the trigger signal ST (Yes branch of the inquiry Step ST11), the determination unit 132 performs the determination processing (inquiry Step ST12). In this manner, the sensing signal S131 is sent from the sensing unit 131 to the determination unit 132, and the determination unit 132 determines whether the personal information is presented on the substitution target screen displayed on the display unit 16.

If the determination unit 132 determines that the personal information is displayed on the substitution target screen (YES branch of the inquiry Step ST12), the determination unit 132 sends the signal S132 to the substitution unit 133 indicating the personal information is displayed on the substitution target screen.

However, if the determination unit 132 determines that the personal information is not displayed on the substitution target screen (NO branch of the inquiry Step ST12), process 700 ends. In this manner, because the determination unit 132 does not output the signal S132 to the substitution unit 133, the substitution target screen displayed on the display unit 16 is maintained.

If the determination unit 132 determines that the personal information is displayed in the substitution target screen (YES branch of the inquiry Step ST12), the substitution unit 133 performs the substitution processing. In this manner, the signal S132 indicating the determination result is sent to the substitution unit 133 from the determination unit 132, and the substitution unit 133 extracts the icons (i.e., icon I1 to I4) indicating the personal information from the standby screen 20 of the substitution target screen (Step ST13). Then, the substitution unit 133 also extracts a position in which the extracted icon is located. The substitution unit 133 stores the extracted icons and their respective positions in the storage unit 14.

Then the substitution unit 133 outputs the display signal S133 to the display unit 16 such that the icon indicating the personal information cannot be recognized, and the substitution unit 133 substitutes the substitution target screen displayed on the display unit 16 with the camouflage screen 40 (Step ST14). Therefore, for example, the standby screen 20 (FIG. 2) displayed on the display unit 16 is substituted with a solid-black camouflage screen 40 (FIG. 4). In this manner, the camouflage screen 40 can prevent the unintended third party from recognizing specific information such as the personal information of the user as described above in the context of discussion of FIG. 3. Additional examples of the camouflage screen 40 are described below in relation to FIGS. 9-11.

As mentioned above, in order to account for emergency situations, if the telephone call unit 134 receives a predetermined telephone number, the substitution unit 133 does not perform the substitution process.

FIG. 8 is an illustration of a process 800 showing the substitution target screen is changed to the camouflage screen 40 using a fingerprint authentication as the trigger. Process 800 may have functions, material, and structures that are similar to the process 700. Therefore common features, functions, and elements may not be redundantly described here.

Process 800 may begin by the sensing unit 131 performing the sensing processing (Inquiry Step ST21). The user can perform a biometric authentication such as the fingerprint authentication from the biosensing unit 18 in order to return the camouflage screen 40 to the original display screen (substitution target screen).

Alternatively, retina verification or voice authentication may be adopted as the biometric authentication. When the retina verification is performed, the biosensing unit 18 function can be performed by a retina sensor. In this manner, the verification is performed using a retina pattern comprising biological information. The retina sensor scans the retina pattern. When the voice authentication is performed, the microphone 15b may be used. In the voice authentication, authentication may be performed using, without limitation, voice characteristics, a voice password, and the like.

If sensing unit 131 senses the trigger signal ST (YES branch of the inquiry Step ST21), the sensing unit 131 sends the sensing signal S131 to the determination unit 132 indicating that the sensing unit 131 senses the trigger signal ST.

If the fingerprint authentication unit 136 authenticates the finger print successfully, the sensing unit 131 senses the trigger signal ST.

The fingerprint authentication unit 136 then generates and sends the trigger signal ST to the sensing unit 131 indicating the successful fingerprint authentication.

Otherwise, if the fingerprint authentication unit 136 is unsuccessful in authenticating the fingerprint, the sensing unit 131 does not sense/receive the trigger signal ST (NO branch of the inquiry Step ST12), and the process 700 ends. In this manner, the sensing unit 131 does not send the sensing signal S131 to the determination unit 132 thereby the camouflage screen 40 displayed on the display unit 16 is maintained.

If the determination unit 132 senses the trigger signal ST, the determination unit 132 performs the determination processing (Inquiry Step ST22). In this manner, the sensing signal S131 is sent from the sensing unit 131 to the determination unit 132, and the determination unit 132 determines whether the camouflage screen 40 is displayed on the display unit 16.

If the determination unit 132 determines that the camouflage screen 40 is displayed on the display unit 16 (YES branch of the inquiry Step ST22), the determination unit 132 sends the signal S132 to the substitution unit 133 indicating the camouflage screen 40 is displayed on the display unit 16.

Otherwise, if the determination unit 132 determines that the camouflage screen 40 is not displayed on the display unit 16 (NO branch of the inquiry Step ST22), the process 700 ends.

The case in which the camouflage screen 40 is not displayed on the display unit 16 corresponds to the case in which the determination unit 132 does not send the signal S132 to the substitution unit 133. Therefore, the camouflage screen 40 displayed on the display unit 16 is maintained.

If the determination unit 132 determines that the camouflage screen 40 is displayed on the display unit 16 (YES branch of the inquiry Step ST22), the substitution unit 133 performs the substitution processing. In this manner, the signal S132 indicating the determination result is sent from the determination unit 132 to the substitution unit 133, the substitution unit 133 reads the extraction result (i.e., the icons and their respective positions) stored in the storage unit 14 (Step ST23).

Then the substitution unit 133 substitutes the camouflage screen 40 with the original display screen such as the display screen SC (Step ST24). Then, the substitution unit 133 accesses the extraction result in the storage unit 14 to return the substituted icon to the original icon. In this manner, the camouflage screen 40 is returned to the original standby screen.

In the process 700-800, the standby screen 20 is used as the display screen SC comprising the specific information such as the personal information. Alternatively, the display screen SC/original display screen (target substitution screen) may be, for example but without limitation, the menu screen 30, a screen of a text editor for creating a document, and the like.

Figure 9:
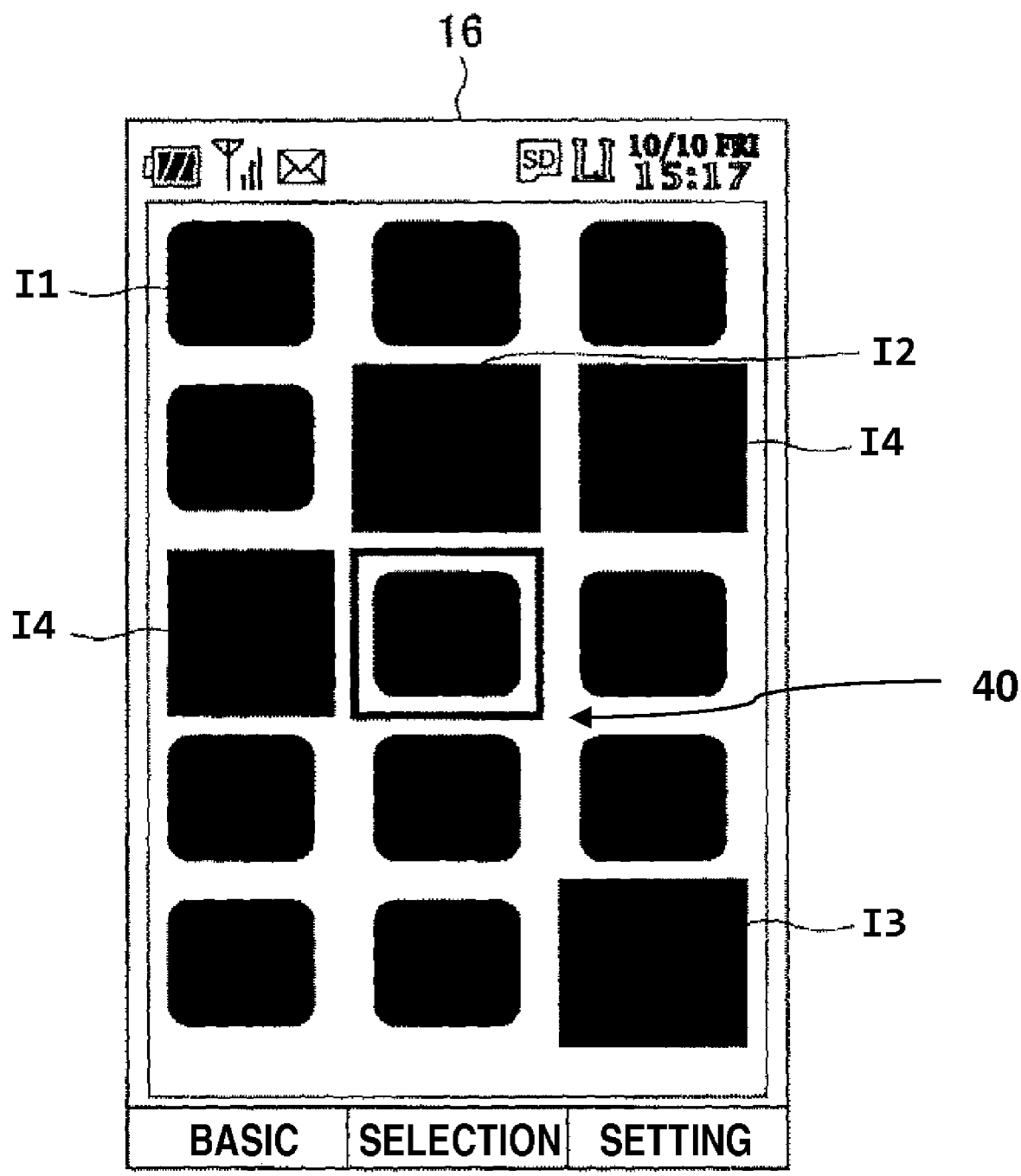
FIG. 9 is an illustration of a schematic view of a camouflage screen according to an embodiment of the disclosure.
Figure 10:
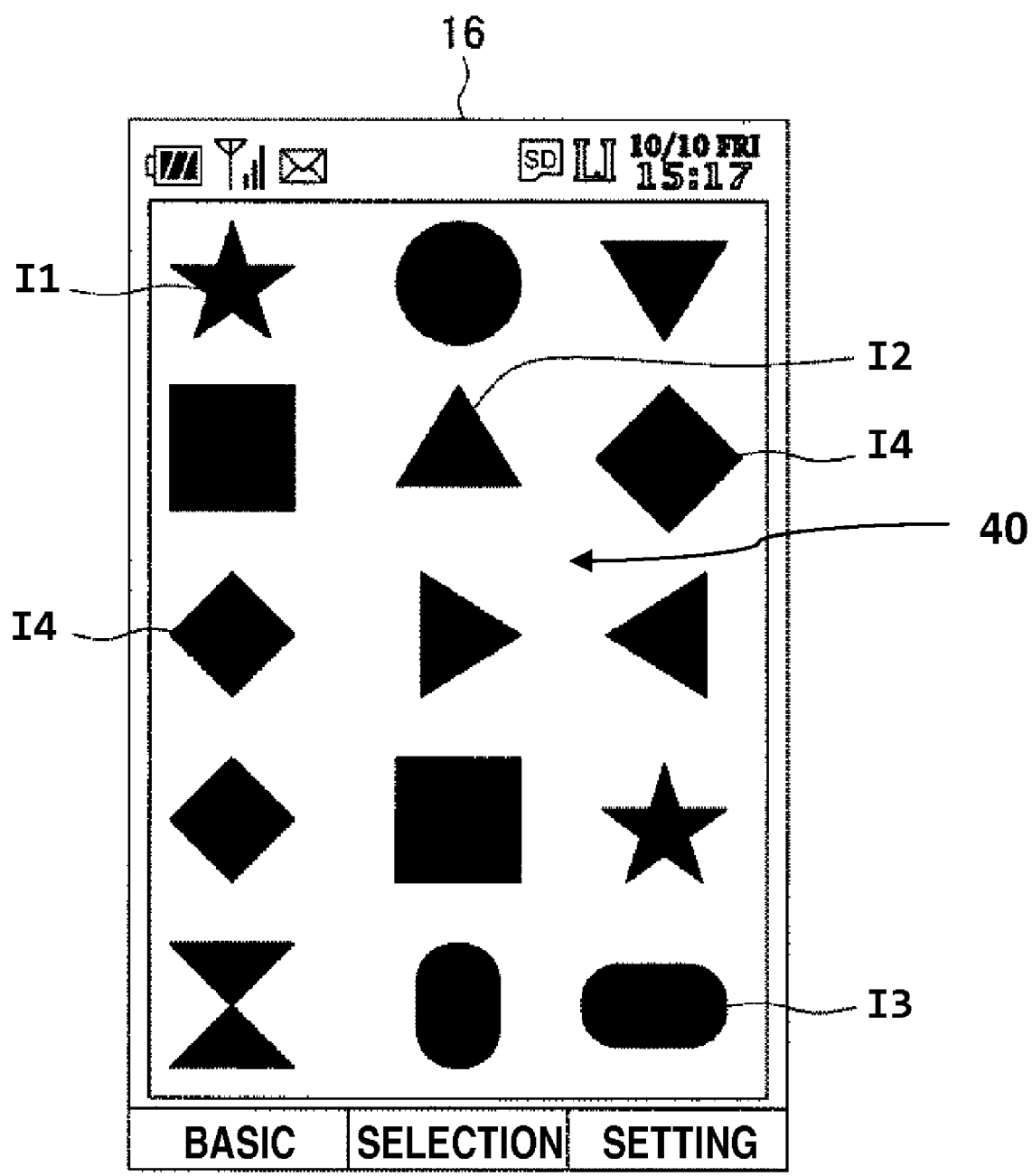
FIG. 10 is an illustration of a schematic view of a camouflage screen according to an embodiment of the disclosure.
Figure 11:
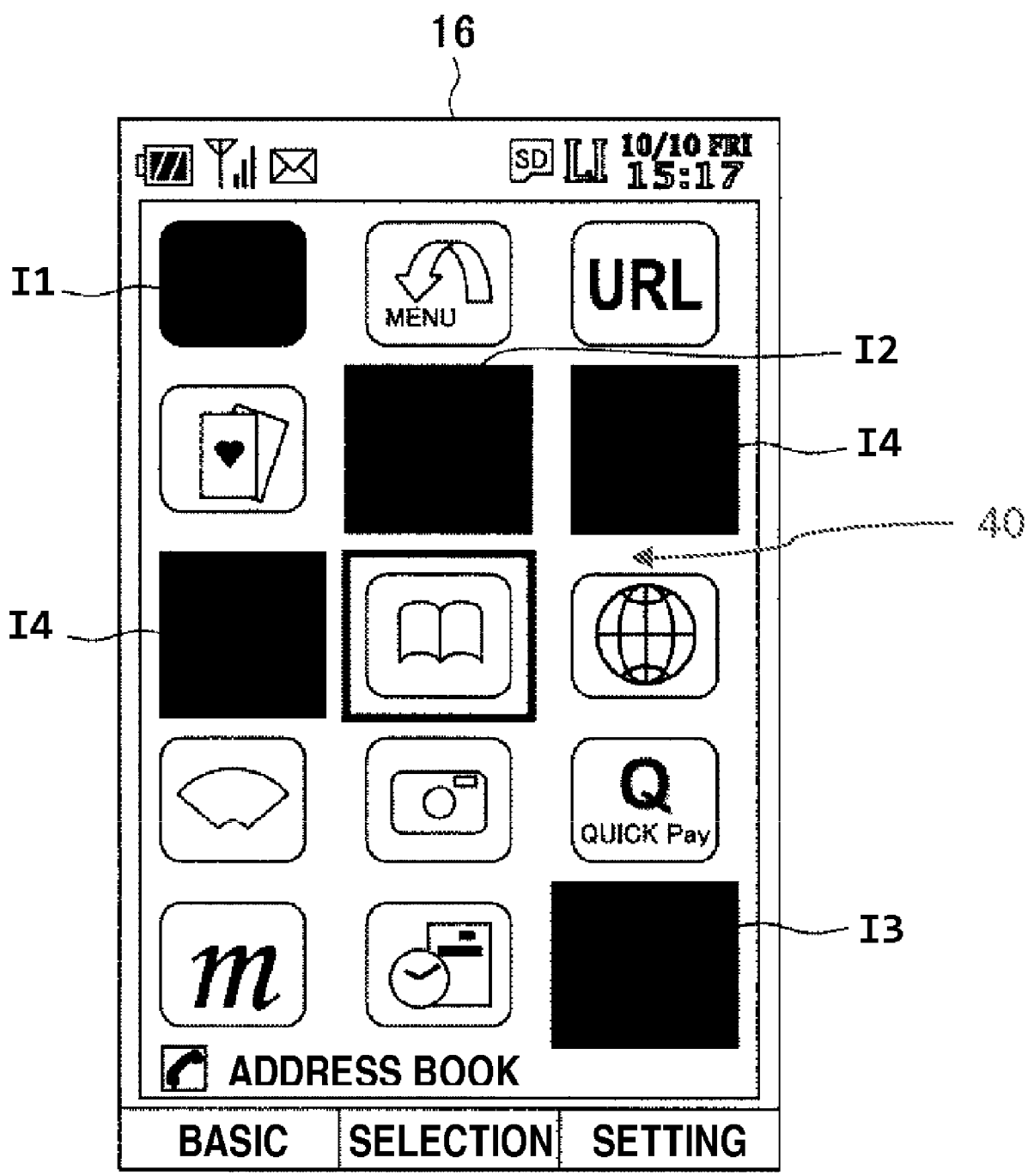
FIG. 11 is an illustration of a schematic view of a camouflage screen according to an embodiment of the disclosure.

FIGS. 9-11 are illustrations of schematic views of camouflage screens according to various embodiments of the disclosure.

As illustrated in FIG. 9, the icons (first image) can be substituted with specific icons (second image) such that at least contents of the icons (i.e., icon I1 to I4) indicating specific information such as the personal information cannot be recognized. For example, the specific icon may be a black icon. In such cases, in Step ST14 (FIG. 7), the substitution unit 133 substitutes the icons with the black icons.

As illustrated in FIG. 10, icons (first image) can be substituted with icons (second image) having various shapes such that at least contents of the icon (i.e., icon I1 to I4) indicating specific information such as the personal information cannot be recognized. In such cases, in Step ST14, the substitution unit 133 substitutes the icons with the icons having various shapes, such as but without limitations, starts, circles, triangles, rectangles, rhombic, flowers, people, and the like.

For example, the original icon I1 is substituted with a star icon. The original icon I2 is substituted with a triangular icon. The original icon I3 is substituted with an ellipsoidal icon. The original icon I4 is substituted with a rhombic icon.

As shown in FIG. 11, parts of icons I1 to I4 (first image), which indicate the personal information, can be substituted with the specific icons (second image). For example, the specific icon is the black icon. In such cases, in Step ST14, the substitution unit 133 substitutes parts of the icons I1 to I4, which indicate the personal information, with the black icons.

Additionally, display magnification of each icon can be changed to reduce or enlarge the icon to an extent in which the information indicated by the icon cannot be recognized.

The position in which the icon is located after the substitution may differ from the position in which the original icon is disposed.

In an embodiment, transmittance of each icon may be varied in a range of about 1% to about 99%. The color of each of the icons is brought close to the background color of the display screen SC with decreasing transmittance, so that display contents of the original icon (i.e., I1 to I4) is substantially unrecognizable. In this manner, the effect similar to the case in which the substitution target icon is substituted with the specific icon can be obtained.

Various methods to display the camouflage screen 40 explained above may be combined. For example, the icon I1 may be substituted with a camouflage star icon, the icon I2 may be substituted with a camouflage red icon, and icon I3 can be reduced. Also, the standby screen 20 may differ from the menu screen 30 in the camouflage method.

When the substituted icon (camouflaged icon) is returned to the original icon such as the icons I1 to I4 comprising the personal information for example, the substitution unit 133 substitutes only the substituted icon with the original icon in Step ST24.

Thus, the camouflage function can be performed by camouflaging only the icons while the number of located icons is recognized. When the icons I1 to I4 indicating the personal information are substituted with other icons, advantageously the icons except for the icons I1 to I4 can be recognized.

In this way, if confidential information such as personal information of the user is displayed on the display screen, the confidential information can be concealed or removed from the display screen, thereby an unintended third party is prevented from accessing the confidential information.

In this document, the terms "computer program product", "computer-readable medium", and the like may be used generally to refer to media such as, for example, memory, storage devices, or storage unit. These and other forms of computer-readable media may be involved in storing one or more instructions for use by the control unit 13 to cause the control unit 13 to perform specified operations. Such instructions, generally referred to as "computer program code" or "program code" (which may be grouped in the form of computer programs or other groupings), when executed, enable the displayed information protection method of the mobile device 10.

While at least one exemplary embodiment has been presented in the foregoing detailed description, the present disclosure is not limited to the above-described embodiment or embodiments. Variations may be apparent to those skilled in the art. In carrying out the present disclosure, various modifications, combinations, sub-combinations and alterations may occur in regard to the elements of the above-described embodiment insofar as they are within the technical scope of the present disclosure or the equivalents thereof. The exemplary embodiment or exemplary embodiments are examples, and are not intended to limit the scope, applicability, or configuration of the disclosure in any way. Rather, the foregoing detailed description will provide those skilled in the art with a template for implementing the exemplary embodiment or exemplary embodiments. It should be understood that various changes can be made in the function and arrangement of elements without departing from the scope of the disclosure as set forth in the appended claims and the legal equivalents thereof. Furthermore, although embodiments of the present disclosure have been described with reference to the accompanying drawings, it is to be noted that changes and modifications may be apparent to those skilled in the art. Such changes and modifications are to be understood as being comprised within the scope of the present disclosure as defined by the claims.

Terms and phrases used in this document, and variations hereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

The invention claimed is:

1. A mobile device, comprising: a display unit operable to display a first image on a display screen thereof; and a control unit comprising:
    a sensing unit operable to sense a trigger signal;
    a determination unit operable to determine whether the first image comprises personal information, wherein the personal information comprises information that has been previously designated as personal information by a user of the mobile device and stored in a memory of the mobile device and the determination unit compares the first image to the personal information stored in the memory to determine whether the first image comprises the personal information; and
    a substitution unit operable to display a second image on the display screen in response to the trigger signal to conceal the first image, if the first image comprises the personal information.

2. The mobile device according to claim 1, wherein the display unit is further operable to display the first image and the second image on the display screen.

3. The mobile device according to claim 1, wherein the control unit further comprises an electronic mail processing unit operable to:
    receive an electronic mail; and
    generate the trigger signal based on the electronic mail.

4. The mobile device according to claim 1, wherein the control unit further comprises a biometric authentication unit operable to:
    perform a biometric authentication using biological information; and
    generate the trigger signal if the biological information is authenticated.

5. The mobile device according to claim 4, wherein the substitution unit is further operable to:
    maintain the second image on the display screen, if the biological information is not authenticated; and
    substitute the first image for the second image otherwise.

6. The mobile device according to claim 1, wherein the trigger signal is generated based on at least one manipulation of a manipulation unit.

7. The mobile device according to claim 6, wherein a delay in the at least one manipulation of the manipulation unit generates the trigger signal.

8. The mobile device according to claim 1, wherein the control unit further comprises a telephone call unit operable to:
    perform a telephone call function to receive an incoming telephone call, and
    generate the trigger signal based on the incoming telephone call.

9. A mobile device, comprising a display unit operable to display a first image on a display screen thereof and a control unit comprising:
    a sensing unit operable to sense a trigger signal;
    a determination unit operable to determine whether the first image comprises confidential information; and
    a substitution unit operable to display a second image on the display screen in response to the trigger signal to conceal the first image, if the first image comprises the confidential information,
    wherein the control unit further comprises a telephone call unit operable to:
        perform a telephone call function to receive an incoming telephone call, and
        generate the trigger signal based on the incoming telephone call, and wherein the substitution unit is further operable to terminate concealing the first image, if the determination unit determines that information displayed on the first image comprises the confidential information and if the incoming telephone call comprises a predetermined phone number previously registered in the telephone call function by the user.

10. The mobile device according to claim 1, wherein the substitution unit is further operable to display the first image on the display unit if the second image is displayed on the display unit and if a second trigger is sensed.

11. A displayed information protection method for a mobile device, the method comprising:
    displaying an original image on a display screen;
    sensing a trigger signal;
    determining whether the original image comprises personal information, wherein the personal information comprises information that has been previously designated as personal information by a user of the mobile device and stored in a memory of the mobile device and determining comprises comparing the first image to the personal information stored in the memory to determine whether the first image comprises the personal information; and displaying a camouflage image on the display screen in response to the trigger signal to conceal the original image, lithe original image comprises the personal information.

12. The method according to claim 11, further comprising:
receiving an electronic mail; and
generating the trigger signal based on the electronic mail.

13. The method according to claim 11, further comprising:
performing a biometric authentication using biological information; and
generating the trigger signal if the biological information is authenticated.

14. The method according to claim 11, wherein the trigger signal is generated based on at least one manipulation of a manipulation unit.

15. The method according to claim 11, further comprising:
performing a telephone call function to receive an incoming telephone call; and
generating the trigger signal based on the incoming telephone call.

16. A non-transitory computer-readable medium for displayed information protection, the computer-readable medium comprising program code for:
displaying an original image on a display screen;
sensing a trigger signal;
determining whether the original image comprises personal information, wherein the personal information comprises information that has been previously designated as personal information by a user of the mobile device and stored in a memory of the mobile device and determining comprises comparing the first image to the personal information stored in the memory to determine whether the first image comprises the personal information; and
displaying a camouflage image on the display screen in response to the trigger signal to conceal the original image, if the original image comprises the personal information.

17. The computer-readable medium according to claim 16, further comprising program code for:
receiving an electronic mail; and
generating the trigger signal based on the electronic mail.

18. The computer-readable medium according to claim 16, further comprising program code for:
performing a biometric authentication using biological information; and
generating the trigger signal if the biological information is authenticated.

19. The computer-readable medium according to claim 16, wherein the trigger signal is generated based on at least one manipulation of a manipulation unit.

20. The computer-readable medium according to claim 16, further comprising program code for:
performing a telephone call function to receive an incoming telephone call; and
generating the trigger signal based on the incoming telephone call.

\* \* \* \* \*